United States Patent Office 2,786,875
Patented Mar. 26, 1957

2,786,875

HYDROCHLORINATION OF ETHYLENE PROCESS

Jasper F. Kobler, Jr., and George T. Mercier, Jr., Houston, and Ruffin G. Stirling, Jr., Pasadena, Tex., assignors to Ethyl Corporation, New York, N. Y., a corporation of Delaware No Drawing. Application December 24, 1953,
Serial No. 400,382

1 Claim. (Cl. 260—663)

This invention relates to the manufacture of ethyl chloride. More specifically, the invention relates to a new and improved process for the production of this valuable chemical by the addition of hydrogen chloride to ethylene under the influence of aluminum chloride catalyst.

It has long been realized that ethyl chloride can be produced by the addition of hydrogen chloride to ethylene. Various techniques have been developed for carrying out this reaction. It is also well established that aluminum chloride is a very effective catalyst for the hydrochlorination reaction. Examples of processes utilizing aluminum chloride in this manner are, for example, Curme, in U. S. Patent 1,518,182 which discloses the anhydrous hydrochlorination of olefins under supra-atmospheric pressures.

The most successful commercial processes involve a technique quite similar to the above cited Curme process. According to the commercial operations, gaseous streams including hydrogen chloride and an ethylene containing stream are mixed and introduced into the bottom of a so-called flooded reactor. The reactor is filled or partially filled with a liquid reaction medium which consists essentially of the desired ethyl chloride product of the reaction. In addition to the ethyl chloride component, the reaction medium contains a minor amount of dissolved aluminum chloride.

In passing up through this reaction medium, the hydrogen chloride is extremely rapidly added to the ethylene, forming additional ethyl chloride. Removal of the product so formed and added to the reaction medium is accomplished in one of several ways. The ethyl chloride may be discharged entirely in the vapor phase and subsequently recovered by condensation by an overhead vapor stream. Alternatively, a side stream of liquid may be withdrawn and the ethyl chloride component vaporized off and purified by fractionation operations.

This operation generally is a highly effective and simple procedure. Unfortunately, several complicating factors tend to deprive the process of its full potential in commercial operation. Although these factors are highly interrelated their individual effects have been observed. A principal factor arises out of the frequent utilization of ethylene containing streams wherein the ethylene is a relatively minor component and various higher molecular weight impurities are present. Such streams are derived from various petroleum hydrocarbon processing operations and may involve utilizing ethylene of only moderate concentration—that is of the order of 20 to 50 volume percent. As such a stream is usually derived as a by-product of an antecedent operation, the non-ethylene components frequently include a variety of materials, at least in minor concentrations. If the non-ethylene components are alkane hydrocarbons such as ethane, they have no significant effect on the hydrochlorination step. However, owing to the complexity of the antecedent processing operations, the ethylene is almost invariably accompanied by varying quantities of other olefinic materials, principally propylene. In the presence of aluminum chloride, this component, even in minor quantities, is quite susceptible to polymerization and this polymerization is catalyzed by and consumes aluminum chloride. The propylene impurity is almost always present in the dilute types of feed described, thus has a tendency of resulting in a much greater aluminum chloride consumption than would be actually required for the formation of the ethyl chloride.

Another factor which contributes frequently to adverse performance of the process arises from unnecessarily high aluminum chloride concentration. It has been established that aluminum chloride in the reactor solution may be present in several forms, which are designated as active and inactive catalysts. Active catalyst is the term given to catalyst corresponding in activity to pure aluminum chloride immediately after being introduced into and dissolved in pure ethyl chloride. Inactive catalyst is formed during the hydrochlorination operation owing to a variety of reactions including the reaction of aluminum chloride with ethyl chloride itself, the polymerization of propylene or other higher olefins, and deactivation owing to the reaction of anhydrous aluminum chloride with traces of aqueous or aqueous reacting substances which may be present. The active and inactive aluminum chloride components can be distinguished, but not by conventional chemical analysis. It has been found that the conversion or degradation of active aluminum chloride to inactive material proceeds substantially all the time. A number of factors affect the rate of this degradation or deactivation. Among these are temperature, higher temperatures causing more rapid deactivation; the presence of the higher olefins heretofore mentioned as impurities; the presence of aqueous reacting materials, and also the concentration of the total aluminum chloride present. By this is meant when aluminum chloride is added in concentrations which are in substantial excess over that required to catalyze a hydrochlorination operation, the excess tends to promote the rate of deactivation. The consequence of this factor is that the catalyst consumption per unit quantity ethyl chloride produced is unnecessarily increased far above the potential requirements.

The deactivation of aluminum chloride and the formation of polymeric material necessitates an additional purification operation. The polymeric liquid material must continually be removed from the system and this is accomplished by drawing off some of the reactor solution and distilling. The ethyl chloride component is recovered, but the polymer bottoms from this distillation is a relatively low value material. The polymer is largely unidentified chemically, but includes deactivated aluminum chloride, some active catalyst, and polymerized complexes of these components with hydrocarbon type materials. Insufficient ethylene and aluminum chloride utilization of course directly affect the magnitude of this purification operation.

Attempts have been made to alleviate the foregoing process deficiencies in various ways. At one time it was customary to add catalysts to a continuous process in a cyclic manner, and in relatively large quantities. The consequence of this technique was that for a period immediately following the addition of a batch of catalysts, the rate of deactivation was inordinately high. To alleviate this somewhat, it has been customary to increase the frequency of addition and minimize the quantity of catalyst added with respect to the volume or weight of the reactive solution. However, this is only a partial solution to the problem and in all commercial processes the actual concentration of aluminum chloride maintained is appreciably higher than is really essential for catalyzing the desired reaction.

The object of the present invention is to provide a more feasible method of minimizing catalyst consumption. A further object is to provide a process which results in more efficient ethylene utilization—that is, which results in the higher conversion of the ethylene component fed to the desired ethyl chloride. Inasmuch as the rate of catalyst deactivation is a factor related to the amount of polymeric residue produced by the reaction, a further object of the invention is to provide a process whereby the amount of polymeric by-products which must be isolated are minimized or substantially reduced. Still another object is to provide a process wherein the efficiency of hydrogen chloride utilization is improved. Other objects will be apparent from the following description and examples.

Generally the invention comprises carrying out the hydrochlorination of an ethylene containing stream as above described and in the presence of an effective quantitl of acetylene and carbon dioxide gas. Although a minor quantity is employed, it is to be understood that an effective quantity is in excess of the trace quantities of those materials which are detectable in virtually all hydrocarbon process streams. Thus, an effective and preferred range is from 0.5 to 2 parts by volume of carbon dioxide to 100 parts by volume of the ethylene component and from about 0.1 to 1.5 parts by volume of acetylene per 100 parts by volume of the ethylene component. Generally, employing acetylene and carbon dioxide in the indicated range of proportions provides good results. Exceeding the preferred proportions is not particularly harmful, although the presence of large amounts of acetylene is to be avoided because the acetylene does react in the hydrochlorination reactor. Concentrations of these materials below the indicated range may have a beneficial effect, but in much lower degree, and when the concentration is less than 0.2 parts of carbon dioxide and the acetylene concentration is less than 0.05 parts, then virtually no beneficial effect will be found.

The carbon dioxide and acetylene additives may be introduced to either the ethylene or the hydrogen chloride stream, or may be fed to the mixed streams prior to their introduction into the reactor. Various methods of adding these materials are available. In a low pressure operation, the acetylene can be introduced by discharge from commercial cylinders of compressed gas. In higher pressure operations several alternative methods of addition may be used. For example, acetylene may be generated by a carbide generator at a pressure sufficiently high to allow feeding the acetylene to the feed gas streams. Another, and particularly advantageous mode of addition involves generating acetylene at atmospheric or only moderate pressure and feeding to the hydrogen chloride stream. In virtually all instances, the hydrogen chloride stream is compressed from low pressure to the necessary hydrochlorination pressure. In such instances, the necessary acetylene is conveniently introduced to the reaction intake of the compressor and compressed jointly with the hydrogen chloride. Although acetylene combines with hydrogen chloride to form vinyl chloride, catalytic conditions are required to effect such a reaction. Compression of a hydrogen chloride stream, containing only minor quantities of acetylene, under anhydrous and non-catalytic conditions, does not result in appreciable reaction. Accordingly, the acetylene is introduced into the hydrochlorination reactor without prior reaction.

The carbon dioxide similarly can easily be provided by allowing vaporization of commercially available solidified carbon dioxide or "Dry Ice" in a reservoir or vessel connected to the desired supply line introduction point.

A surprising feature of the process is that although it is customarily considered that a more concentrated ethylene stream should provide more advantageous results than a less concentrated stream, it has been found that the present process reverses this normal tendency. The advantages of the process and the mode of carrying it out will be evident from the following examples. Example I given hereafter describes a commercial operation wherein carbon dioxide and acetylene were present in detectable quantity, but because of the low concentrations, there was no observable effect on performance of the process.

EXAMPLE I

Hydrogen chloride gas and ethylene were introduced into a commercial ethyl chloride reactor filled with ethyl chloride maintained at about 125 pounds per square inch and 125° F. The composition of the ethylene stream was as follows:

| Component: | Volume percent |
|---|---|
| Ethylene | 98 |
| Carbon dioxide | less than 0.1 |
| Acetylene | 0.005 |
| Ethane | 1 |
| Methane | 0.3 |

The hydrogen chloride employed contained about 97 volume percent hydrogen chloride, the remaining being principally nitrogen and hydrogen. The feed streams were introduced at the average molal ratio of hydrogen chloride:ethylene of 1.06:1. In an extended operation the utilization of hydrogen chloride and ethylene were respectively 64.9 and 47.1 pounds per hundred pounds ethyl chloride produced. The rate of consumption of fresh aluminum chloride catalyst was 1.00 pounds per hundred weight. Stating these raw material utilizations in a different manner, the conversion of the hydrogen chloride to ethyl chloride was 87.5 percent efficient and the ethylene conversion was 92.5 percent efficient. The aluminum chloride consumption has no specific theoretical requirements.

EXAMPLE II

In the same commercial process as above described, a separate operation was carried out, again utilizing a hydrogen chloride:ethylene feed ratio of 1.06:1. In this instance, carbon dioxide and acetylene were fed with the ethylene stream, in the proportions of 1 and 0.6 part by volume, respectively, to 100 parts of ethylene. The ethylene feed stream thus had the following composition:

| Component: | Volume percent |
|---|---|
| Ethylene | 94 |
| Ethane | 3 |
| Carbon dioxide | 0.9 |
| Acetylene | 0.6 |
| Methane | 1.3 |

The same hydrogen chloride stream as in Example I was employed. In an extended operation the utilization or consumptions of these components was as follows: hydrogen chloride, 62.6 pounds per hundred pounds ethyl chloride; ethylene, 45.4 pounds per hundred pounds ethyl chloride; and aluminum chloride, 0.60 pounds per hundred pounds ethyl chloride. These results correspond to a hydrogen chloride efficiency of 90.4 percent, and an ethylene efficiency of 95.8 percent conversion to ethyl chloride.

From the foregoing results it is apparent that the presence of carbon dioxide and acetylene provided an appreciable and valuable reduction in the amount of hydrogen chloride, ethylene, and aluminum chloride necessary for the process, as contrasted with Example I.

The process is not limited to concentrated ethylene streams as used in the above examples but is also applicable in other instances wherein the ethylene concentration may be as low as 25 or 30 volume percent.

Having described the invention and the best manner of its operation, what is claimed is:

In the hydrochlorination of ethylene by contacting gaseous ethylene containing and hydrogen chloride containing feed streams to a liquid reaction medium consisting essentially of ethyl chloride containing a catalytic quantity of aluminum chloride, the improvement comprising continuously feeding gaseous carbon dioxide and acetylene to the reaction medium in the proportions of 0.5 to 2 parts by volume of carbon dioxide and 0.1 to about 1.5 parts by volume of acetylene to 100 parts of ethylene by volume.

No references cited.